W. H. HUTH.
MUSICAL INSTRUMENT FOR TEACHING.
APPLICATION FILED JUNE 23, 1919.
1,392,766.  Patented Oct. 4, 1921.
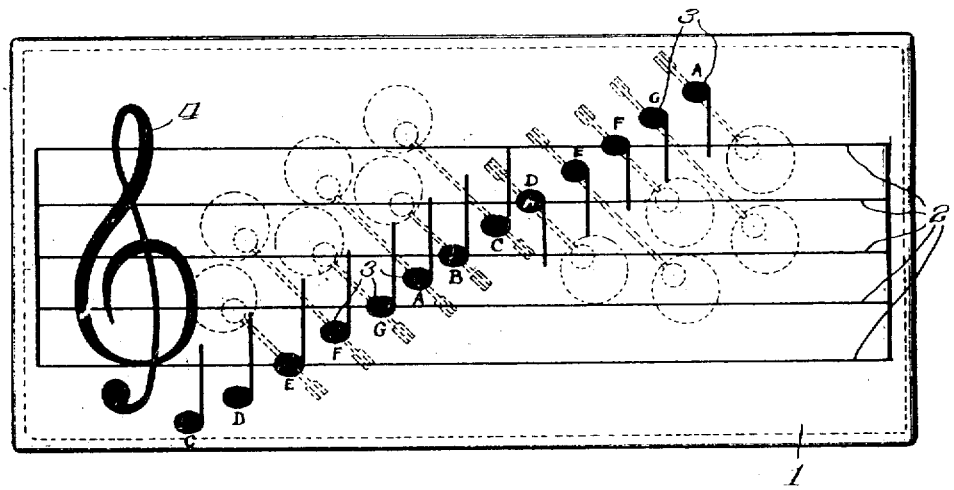
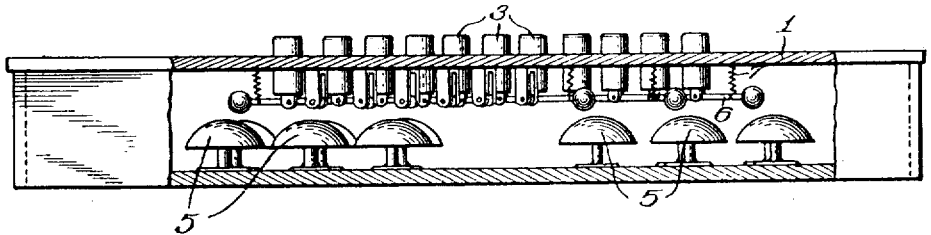
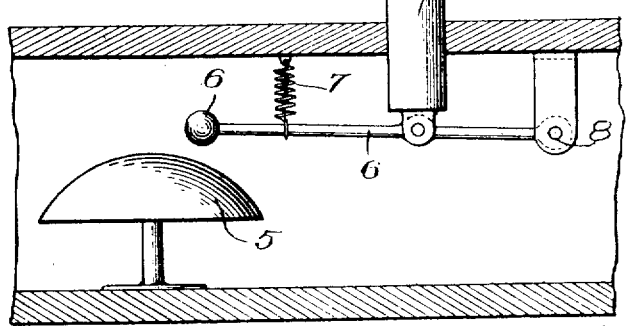
Inventor:
W. H. Huth
By Arthur F. Durand
Atty.

UNITED STATES PATENT OFFICE.

WALTER H. HUTH, OF CHICAGO, ILLINOIS.

MUSICAL INSTRUMENT FOR TEACHING.

1,392,766.  Specification of Letters Patent.  Patented Oct. 4, 1921.

Application filed June 23, 1919. Serial No. 306,089.

*To all whom it may concern:*

Be it known that I, WALTER H. HUTH, a citizen of the United States of America, and a resident of Chicago, Illinois, have invented a certain new and useful Improvement in Musical Instruments for Teaching, of which the following is a specification.

This invention relates to musical toys or devices for use in the teaching of music.

The object of the invention is to provide a device having a construction and arrangement in which the notes of the musical scale, or the notes of a musical composition, if necessary or desirable, as shown on the usual staff, are represented by push buttons, so that each button represents a note in the scale, or in the musical composition, and in which each push button is connected with sound-producing means of any suitable character, concealed behind the staff whereby, when any push button simulating a certain note is operated, the sound-producing means will be operated to cause the particular note to be sounded, as by the striking of a bell or other means tuned to produce the required note, and whereby the invention involves a musical scale or series of notes on a staff, closely simulating printed music, but modified just enough to make the device operable as a musical instrument as well, as will more fully appear.

It is also an object to provide certain details and features of construction and combinations tending to increase the general effectiveness and the desirability of an instrument or device of this particular character.

To these and other useful ends the invention consists in matters hereinafter set forth and claimed.

In the accompanying drawings—

Figure 1 is a plan of an instrument embodying the principles of the invention.

Fig. 2 is a side elevation of said instrument, showing the outer wall of the structure broken away to bring into view the sound-producing means inclosed therein.

Fig. 3 is an enlarged detail section showing one of the bells and its allotted push button, and the hammer which is operated by the push button to strike the bell.

As thus illustrated, the invention comprises a box or housing 1 having its top wall provided with five parallel lines 2 representing the ordinary musical staff. These lines can be printed on the top of the box, or can be formed in any suitable manner. The push buttons 3 are arranged in the form of a scale, and are preferably oval to make them look like musical notes, but the stem of each note, of course, is merely printed or otherwise formed on the top surface of the box. It will be understood, of course, that the notes can be arranged in any suitable manner, and can be arranged to represent either the simple scale, as shown, or a chromatic scale if necessary or desirable. Also the notes can be arranged to represent a melody, or some portion of a musical composition if this is desired. In any event, though, the push buttons simulate or represent the heads of musical notes on a staff, and the usual clef 4, or any of the clefs ordinarily employed, can be printed in its proper place on the top of the box or housing. Each said note has a stationary stem, and in this way the buttons and stems give the appearance of ordinary fixed or printed notes, as the movements of the buttons are not noticeable and do not disturb the stems of the notes.

Any suitable means can be employed for producing sounds corresponding to the notes of the scale by the operation of the push buttons. As shown, bells 5 are inclosed in the box, and each push button has a pivoted hammer or striker 6 for striking its allotted bell, the hammer and push button being held normally raised by a spring 7, so that when any push button is pressed downward its hammer will strike the proper bell. As shown, the axis of each striker, it will be seen, (see the arrangement shown in dotted lines in Fig. 1) is disposed obliquely to the staff, instead of parallel therewith, whereby the notes of the scale are arranged close together, and the elements of the sound producing means are disposed to advantage, as shown. It will be understood, however, that this is merely illustrative of the invention, and that sound-producing means of any suitable character can be employed. Also, of course, the means whereby the push buttons control the sound producing means can be of any suitable or desired character.

Thus, with the construction shown and described, a musical toy is provided, and it may also be employed to assist in teaching music. Ordinarily, of course, when a musician or person learning music desires to sound the notes of a scale, or the notes of a musical composition, as represented by the notes ordinarily appearing on a sheet of printed music, this is accomplished by operating a key or other means to produce sounds corresponding to the notes of printed music. With the herein described invention, however, the finger is placed directly on a note on the staff, in order to produce the corresponding musical tone, and this will assist the child or even the adult student of music in learning the scale, and will help to fix in mind the tones which represent the notes of the scale, inasmuch as the sound-producing means are controlled by devices which are located on the musical staff itself, and which simulate the notes of the scale, or the notes of a musical composition. In this way, therefore, there is a closer relation between the instrumentalities which, in a sense to the vision represent the musical tones and the instrumentalities which actually produce the musical tones. In other words, the proposition is more or less psychological, for the musical note itself, as it appears on the staff, is capable of actuation to produce the musical tone which it represents. There is nothing to distract the mind, or to take the attention away from the button which is pushed, as all of the mechanism forming the musical instrument part of the structure is concealed except said buttons. The sound, of course, does not take the eye away from the music staff. Nothing happens, when a button is pushed, except that a sound is produced, and that appeals only to the ear.

Of course, the notes may also have the letters A, B, C, etc. associated therewith, as shown, to indicate the place which each note occupies in the musical scale, and this will be true whether the notes have the arrangement of a scale or of a melody, or of a chord, or anything else. The staff lines can be omitted, if desired, and the letters alone used as the means to indicate what the notes are, but the notes preferably have the relative arrangement necessary to simulate ordinary printed music, such as a scale or melody, or other arrangement, on the ordinary staff, even though the latter may be omitted. With the construction shown and described, the character of the device as a musical instrument, or its capacity to serve as a musical or semi-musical instrument, is practically entirely concealed, as there is very little, if anything, on the face of the device to indicate that it is capable of producing musical notes, or being used for musical purposes. Therefore, the structure closely simulates the actual appearance of ordinary printed music, or of a printed scale on an ordinary staff, this being the dominant or primary characteristic of the device, and its capacity for use as a musical instrument being secondary and practically concealed or rendered unobvious; for with the stationary stems of the notes, the general effect is that of notes which are entirely stationary on the staff. The stems extend vertically and tangentially to the side edge of the holes in which the push buttons operate, so that each push button and its allotted stem have the appearance of being joined together whether the button is up or down.

As shown and described, the push buttons 3 are preferably straight, as shown in Figs. 2 and 3, so that their upper ends are adapted to pass through the top wall of the housing or body 1, for convenience in assembling the parts, and said body or housing is of a portable character and adapted to rest on any suitable support to present the push buttons in position for manual operation on the upper surface of the said top wall, thereby to operate the strikers in the chamber below the top wall, as explained, to produce musical tones corresponding to the notes represented by the push buttons on the music staff. The rectangular body thus equipped with everything necessary for the production of musical tones corresponding to the notes represented on the staff, by the impact of the strikers on the bells, or on any suitable vibratory sound producing means, can be placed in any desired position for the operation thereof, of course, but is preferably adapted to rest horizontally upon a table or other support, or in such a position that the top wall of the housing or body is more or less horizontal, or faces upward, so that the push buttons move downward to operate the strikers. As shown, the push buttons are oblong, when viewed at right angles to the surface of the top wall in which they operate, in order to more closely simulate the exact appearance of printed music, but they may be of any suitable or desired shape. As shown and described, a stem 8 is provided for each push button, so that each push button and its allotted stem will have the general form and appearance of a printed note, these stems being formed or provided in any suitable or desired manner on the surface of the top wall so that while each note has a movable head (the push button) it also preferably has a fixed or stationary stem.

What I claim as my invention is:

1. In a musical instrument, the combination of a body having a horizontal top surface of requisite area, a staff on said surface, stems having fixed positions on the staff, downwardly movable push buttons forming the heads of the stems, with each stem extending from one side of its allotted push button, so that each stem and its push button have the appearance of being joined together whether the button is up or down, whereby each button can be operated without disturbing its allotted stem, and sound producing means concealed under said staff and controlled by said push buttons, so that all of the mechanism of the instrument is concealed except said buttons, whereby the result of pushing a button appeals only to the ear, the fixed stems and movable push buttons being formed to simulate the notes of ordinary printed music.

2. A structure as specified in claim 1, said body being a rectangular flat box which contains the sound producing means, and said surface being the top of said box, which top has holes therein for said push buttons, with the bottom of said box spaced a distance below the top and having the sound producing means mounted thereon, and each push button having a striker extending obliquely to the staff.

3. A structure as specified in claim 1, said notes being arranged on the staff to form a scale having note-heads elongated longitudinally of the staff and each provided with a letter corresponding to the note which it represents in said scale.

4. In a musical instrument, the combination of a portable hollow body forming a chamber having a top wall provided with holes therein, pivoted strikers in said chamber, sound producing means inclosed in said chamber and located to respond to the impact of said strikers to produce musical tones, a music staff on said top wall, the axis of each striker extending obliquely to said staff, and push buttons representing notes on said staff and movable up and down in said holes to actuate the strikers.

WALTER H. HUTH.